United States Patent [19]
Lee

[11] Patent Number: 5,802,693
[45] Date of Patent: Sep. 8, 1998

[54] METHOD OF FABRICATING A REFUSE CONTAINER

[75] Inventor: Norman C. Lee, Greensboro, N.C.

[73] Assignee: Compagnie Plastic Omnium, France

[21] Appl. No.: 780,870

[22] Filed: Jan. 24, 1997

Related U.S. Application Data

[62] Division of Ser. No. 402,883, Mar. 10, 1995, abandoned.

[51] Int. Cl.⁶ .............................. B23P 17/00; B29D 7/00
[52] U.S. Cl. .................................. 29/416; 29/434; 29/412; 264/159
[58] Field of Search .................. 29/412, 415, 416, 29/425, 434; 264/516, 540, 534, 431, 152, 157, 159; 220/908, 909, 23.8

[56] References Cited

U.S. PATENT DOCUMENTS

| | | | |
|---|---|---|---|
| 1,866,074 | 7/1932 | Angelbeck . | |
| 3,402,848 | 9/1968 | Busey | 220/63 |
| 3,432,586 | 3/1969 | Stenger | 264/94 |
| 3,456,290 | 7/1969 | Ruekberg | 18/5 |
| 3,720,346 | 3/1973 | Cypher | 220/22.3 |
| 3,793,421 | 2/1974 | Paubandt | 264/89 |
| 3,862,698 | 1/1975 | Hafele | 215/1 |
| 3,904,218 | 9/1975 | Kostic | 280/79.2 |
| 3,924,738 | 12/1975 | Poupitch | 264/159 |
| 4,113,125 | 9/1978 | Schiller | 217/302 |
| 4,332,633 | 6/1982 | Yamauchi et al. | 156/62.2 |
| 4,479,751 | 10/1984 | Wyman et al. | 414/406 |
| 4,701,295 | 10/1987 | Kato et al. | 264/519 |
| 4,834,253 | 5/1989 | Crine | 220/1 T |
| 4,878,592 | 11/1989 | Lee | 220/23.83 |
| 4,893,719 | 1/1990 | Lombardi et al. | 200/1 T |
| 4,940,459 | 7/1990 | Callas et al. | 220/404 |
| 4,960,220 | 10/1990 | Foa | 220/23.83 |
| 4,969,813 | 11/1990 | Lee et al. | 425/503 |
| 5,026,268 | 6/1991 | Lee | 425/525 |
| 5,076,462 | 12/1991 | Perrone | 220/404 |
| 5,088,750 | 2/1992 | Besse et al. | 280/47.26 |
| 5,101,997 | 4/1992 | Bagwell et al. | 220/23.4 |
| 5,114,304 | 5/1992 | Edelhoff et al. | 414/786 |
| 5,129,535 | 7/1992 | Hradisky | 220/23.4 |
| 5,139,299 | 8/1992 | Smith | 294/159 |
| 5,167,342 | 12/1992 | Merritt | 220/404 |
| 5,167,351 | 12/1992 | Prout et al. | 220/338 |
| 5,183,278 | 2/1993 | Wade, Jr. | 280/47.35 |
| 5,184,744 | 2/1993 | Paulison | 220/23.4 |
| 5,184,836 | 2/1993 | Andrews, Jr. et al. | 280/79.5 |
| 5,303,841 | 4/1994 | Mezey | 220/555 |
| 5,390,813 | 2/1995 | Anderson et al. | 220/404 |

FOREIGN PATENT DOCUMENTS

| | | |
|---|---|---|
| 496990A | 8/1992 | European Pat. Off. . |
| 3644075 | 7/1988 | Germany . |
| 3703557 | 8/1988 | Germany . |

*Primary Examiner*—David P. Bryant
*Assistant Examiner*—Tisa Stewart
*Attorney, Agent, or Firm*—Conley, Rose & Tayon, P.C.

[57] ABSTRACT

A refuse container adapted for automated dumping operation comprises a pair of side-by-side container bodies joined along a portion of their respective rims by a connecting web and rigidly integrated with one another by upper and lower lifter bars affixed transversely to each container body in disposition to be engageable by grasping members of an automated dumping apparatus. The refuse container is advantageously fabricated by a method wherein a unitary hollow container structure is blow molded to initially form the two container bodies in tandem end-to-end mirror-image relation joined by a continuous annular connecting portion. The connecting portion is partially removed at each rim, leaving the connecting web therebetween, whereby the two container bodies may be pivoted into side-by-side relation and rigidly joined by affixation of the upper and lower lifter bars. A hinged lid may be pivotably connected to the container proximate the connecting web. The lid will selectively cover either container body.

14 Claims, 5 Drawing Sheets

METHOD OF FABRICATING A REFUSE CONTAINER

This is a divisional of co-pending application(s) Ser. No. 08/402,883 filed on Mar. 10, 1995, now abandoned.

BACKGROUND OF THE INVENTION

The present invention relates generally to refuse containers and the manufacture thereof and, more particularly, to plastic trash containers of the type adapted for mechanized emptying by an automated dumping apparatus of the semi-automatic type and to methods of fabricating such containers using plastic molding techniques.

In recent years, municipalities, as well as private firms, have increasingly begun to implement and utilize automated trash collection systems for curbside trash collection to obtain the advantages of increased trash collection speed, a corresponding reduction in required equipment and personnel, and an attendant reduction in required manual handling of trash containers, all of which ultimately result in significant savings in the overall costs of operation of a trash collection system.

In addition, many municipalities and private firms have accelerated efforts to retrieve and recycle normal items of household refuse which can be reprocessed and remanufactured into other articles, e.g. newspapers, plastic containers, steel cans, and aluminum cans and products, etc. Typically, however, recyclables are collected manually rather than by automated trash collection systems.

In recognition of the desirability of recycling reclaimable household refuse while at the same time recognizing that much of common household refuse cannot be reclaimed and recycled, various types of multi-compartmented refuse containers have been proposed to enable the segregated collection of non-reclaimable refuse and recyclable materials. A number of such compartmented containers provide a single overall container body with one or more walls partitioning the interior of the container into two or more compartments. Since substantially all trash containers are conventionally fabricated of thermoplastic materials by one of several various molding processes, the provision of internal partitioning walls normally necessitates an additional manufacturing step to mount and seal such walls to prevent leakage between the differing compartments of the container, which can be difficult and costly to accomplish.

SUMMARY OF THE INVENTION

It is accordingly an object of the present invention to provide a compartmented refuse container which overcomes the disadvantages of the prior art. More particularly, it is an object of the present invention to provide a compartmented refuse container which is easy and simple to fabricate without requiring special installation and sealing of partitioning walls, while essentially eliminating any potential for leakage of contents from one compartment to another. A further object of the present invention is to provide such a refuse container which is adapted for mechanized emptying by an automated dumping apparatus, preferably of the semi-automatic type. A further object of the present invention is to provide a novel method by which a refuse container of the foregoing character may be readily and economically manufactured. Other objects of the present invention will become apparent from the following description of one specific preferred embodiment of the present invention.

Briefly summarized, the refuse container of the present invention, in its most fundamental aspect, comprises a pair of container bodies each defining an interior receiving area and each having a closed lower end and an open upper end defining an access opening into the respective interior receiving area. The container bodies are disposed in side-by-side relation with their respective open upper ends adjacent one another and the container bodies are integrally joined along a portion of their respective upper ends by a connecting web extending therebetween. At least one connecting bar is affixed to each container body to extend transversely therebetween. Preferably, the refuse container is adapted for automated dumping operation by an automated dumping apparatus and, for such purpose, upper and lower lifter bars are affixed to extend transversely between the container bodies in appropriate spaced disposition to be engageable by grasping members of the automated dumping apparatus.

In the preferred embodiment, the refuse container has wheels affixed to the lower ends of the container bodies at the side thereof opposite the lifter bars to facilitate rolling movement of the container over the ground or other supporting surface. A handle is affixed to the upper ends of the container bodies at the same side as the wheels for manual manipulation of rolling movement of the container.

Also in the preferred embodiment, a hinged lid is provided which will selectively cover either of the container bodies. The lid engages the upper open end of the container body to form a relatively secure closure and seal.

The method of the present invention provides for fabrication of a refuse container having dual side-by-side container bodies by initially forming a unitary hollow container structure wherein a pair of container bodies each having an open end and a closed end are arranged in general alignment with one another with the respective open ends facing one another and the respective closed ends disposed away from the other container body with a connecting web joining at least a portion of the respective open ends. The container bodies are moved relative to one another while bending the connecting web therebetween to orient the container bodies in side-by-side relation with the respective open ends adjacent one another and, then, the container bodies are transversely affixed together in such side-by-side relation.

In the preferred form of the present method, the hollow container structure is formed by molding of a thermoplastic material, preferably by blow molding, to form the container structure with the open ends of both containers integrally joined by the connecting web about substantially the entirety of the respective open ends. After molding is completed, a portion of the connecting web is removed, e.g. by cutting the connecting web, whereby the remaining portion of the connecting web acts as a bendable hinge to enable movement of the container bodies relative to one another into side-by-side relation. The container bodies are preferably affixed in such disposition by securing at least one, and preferably two, connecting bars to each container body to extend transversely therebetween to serve as automated dumping lifter bars.

DETAILED DESCRIPTION OF THE PREFERRED EMBODIMENT

Figure 1:
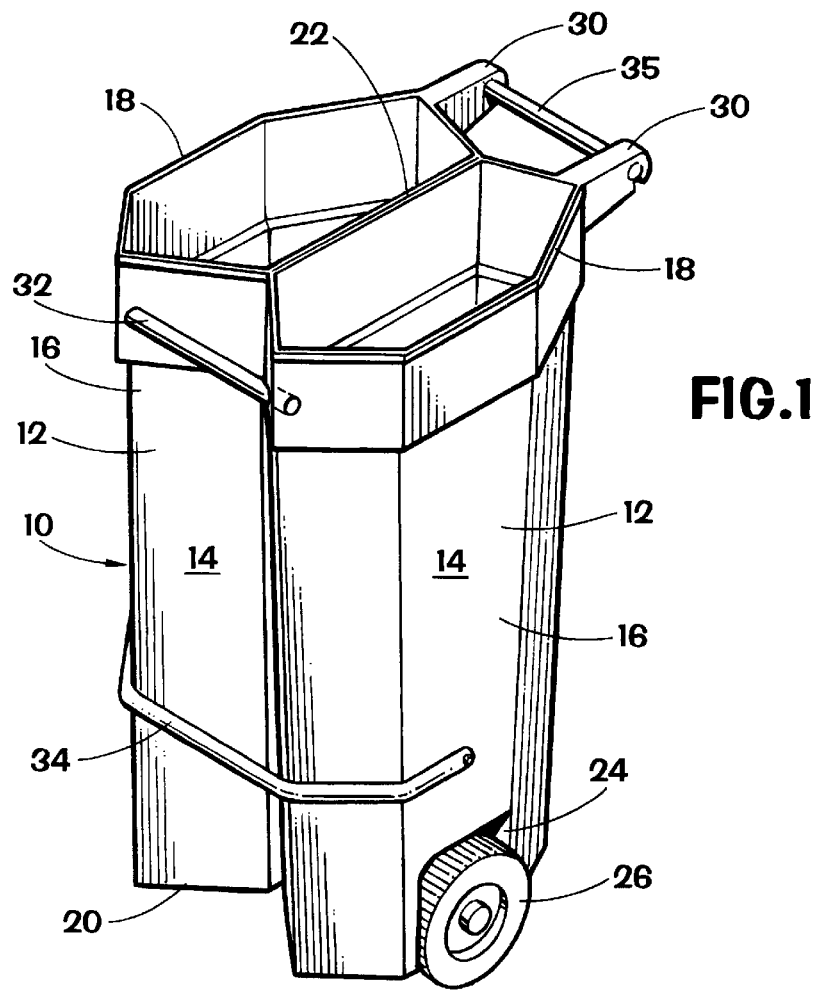
FIG. 1 is a perspective view of a refuse container according to the preferred embodiment of the present invention.
Figure 2:
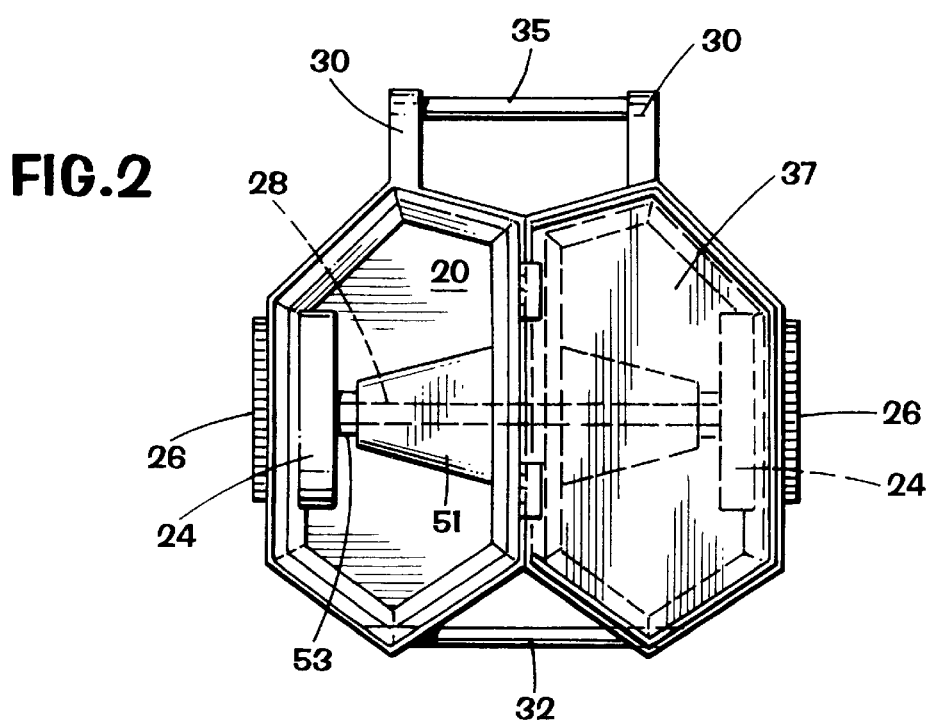
FIGS. 2 and 3 are top plan and side elevational views, respectively, of the refuse container of FIG. 1 which includes an attached hinged lid.
Figure 3:
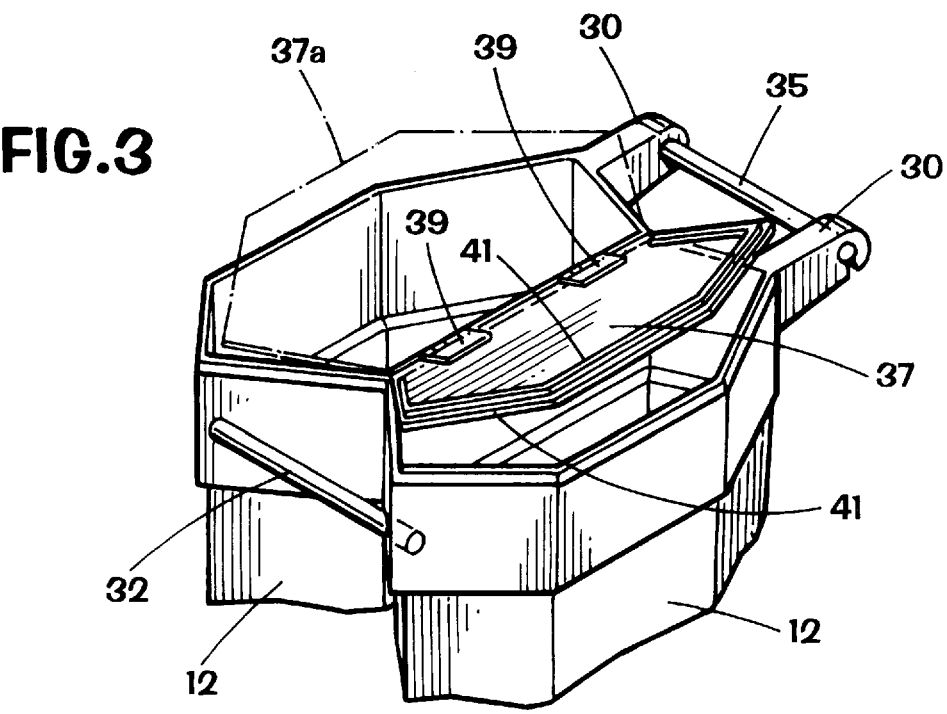

Referring now to the accompanying drawings and initially to FIGS. 1 through 3, an exemplary refuse container in accordance with the present invention is indicated generally at 10. Basically, the refuse container 10 comprises two container modules 12, each having a module body 14 of a hexagonal cross-sectional shape formed of six side walls 16 terminating at their respective upper ends in an annular container rim 18 and merging at their respective lower ends into a closed bottom wall 20. The container modules 12 are disposed in side-by-side mirror-image relation and joined at their respective rims 18 by a connecting web 22 formed integrally with respective segments of each module's hexagonal rim 18. Each container module 12 has a wheel well 24 formed at its lower end in the outwardly facing side wall 16, within which a pair of wheels 26 are disposed and connected by an axle 28 extending through the respective container modules 12.

A flange 30 projects rearwardly from the body 14 of each container module 12 at the same side thereof as the wheels 26 and a connecting bar 32 is affixed between the two container modules 12 to the respective flanges 30 and to the opposite forward side of each module body 14. Another connecting bar 34 is affixed to the body 14 of each container module 12 to extend transversely therebetween at a spacing below the connecting bar 32.

A handle 35 extends between the flanges 30 and by means of the container modules 12 may be tilted on the wheels 26 and rolled by the wheels 26 from place to place over the ground or other supporting surface. The connecting bar 32 in conjunction with the lower connecting bar 34 serve as upper and lower lifter bars by which the container 10 may be mounted by collection personnel into a compatible automated dumping apparatus on a collection vehicle for mechanized inversion of the container 10 by the bars to empty its contents into the collection vehicle. Inasmuch as such automated trash collection systems are conventional and form no part of the present invention, an automated trash collection apparatus is not depicted in the drawings. Representative examples of semi-automatic dumping apparatus are the TUCK-AWAY® brand dumping unit manufactured and sold by Perkins Manufacturing Company of Le Grange, Ill., and the dumping apparatus disclosed in Wyman et. al., U.S. Pat. No. 4,479,751.

Figure 4:
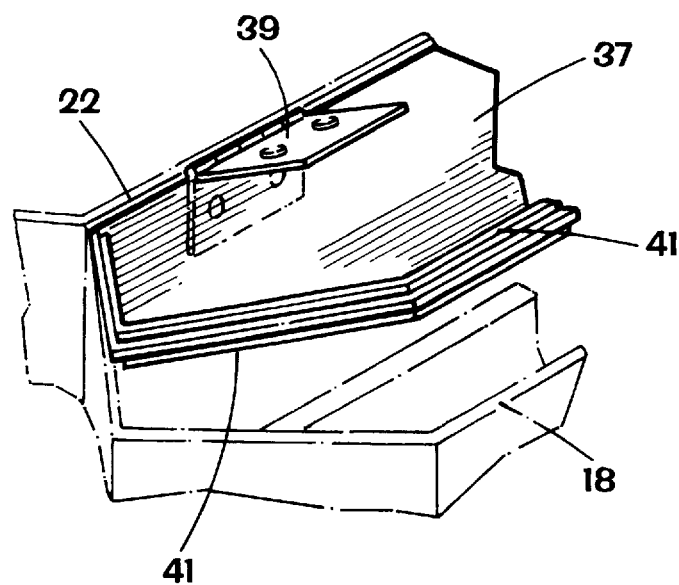
FIG. 4 is a detail of an exemplary hinged lid.

In the preferred embodiment, a hexagonal lid 37 (in FIGS. 2–4) is attached to the container 10 by a pivotable hinge 39 which is affixed to the container 10 at the connecting web 22. The lid 37 presents a pair of flat hexagonally shaped sides. A flange 41 projects from both sides. Each of the flanges 41 runs parallel and proximate to five of the six hexagonal edges of the lid 37. The flanges 41 are shaped and sized to engage the rim 18 of a container body 12 to form a relatively secure closure and seal. The hinge 39 permits the lid 37 to be pivoted to cover either container body 12 as desired. FIG. 3 illustrates operation of the lid 37 in this manner by showing the lid in a position to be secured over one of the container bodies 12 (indicated at 37) and also showing the lid (in phantom at 37a) in position to be secured over the other container body 12. The lid 37 may be secured to close either container body 12 by engagement of the rim 18 of that container body 12 with its complimentary flange 41. The ability to secure the lid 37 selectively over either individual container body 12 allows refuse or other material within one container body 12 to be retained within the container body 12 during emptying of the other container body 12.

Figure 5:
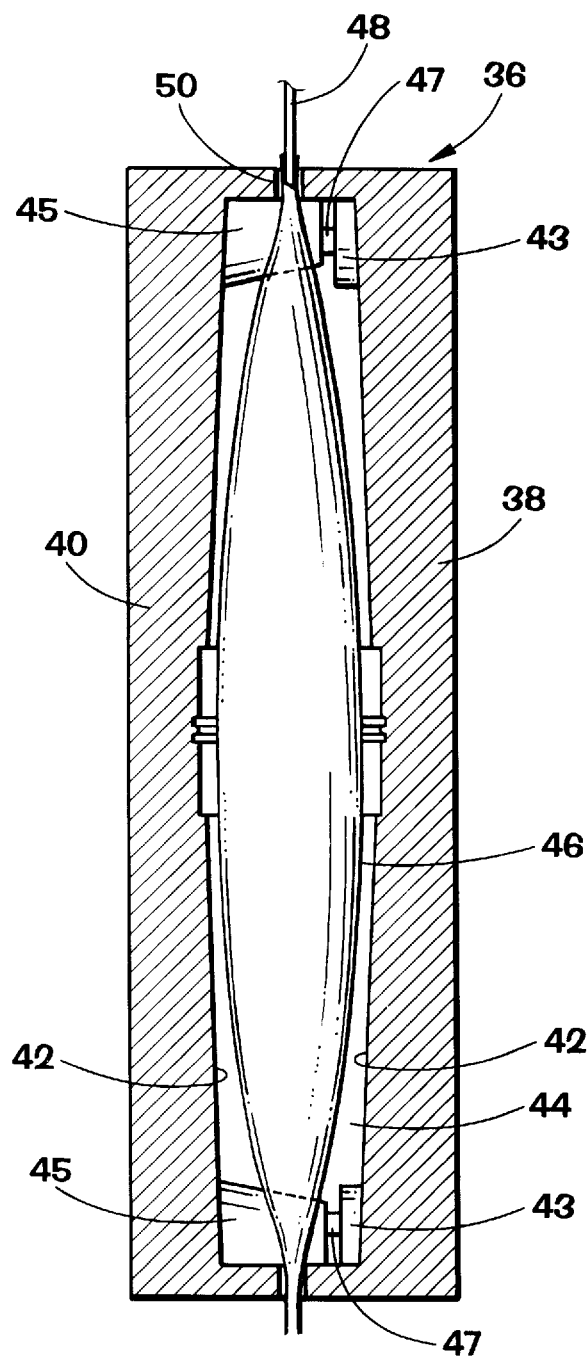
FIG. 5 is a schematic lengthwise cross-sectional view of a blow molding apparatus utilized in fabrication of the refuse containers of FIGS. 1 through 5.

Referring now to FIGS. 5–9, the method of the present invention for fabricating the container 10 of FIGS. 1 through 3 is sequentially depicted. FIG. 5 depicts schematically a blow molding apparatus, generally indicated at 36, suitable for fabricating the plastic body structure of the container modules for the container 10. Basically, the blow molding apparatus 36 includes two mold halves 38, 40 (which may be assembled of multiple mold sections, not shown), which are profiled at their respective facing surfaces to cooperatively define a mold recess 42. In conventional fashion, the mold halves 38, 40 are supported for selective movement toward and away from one another between an opened position wherein the mold halves 38, 40 are separated in spaced facing relation (not shown) and a closed molding position wherein the mold halves 38, 40 are brought together with their respective facing surfaces in abutting contact such that their respective recesses 42 cooperatively define a substantially enclosed mold cavity 44, as illustrated in FIG. 5. Wheel well mold blocks 43 are located in the upper and lower corners of the mold half 38. The wheel well mold blocks 43 are shaped and sized so that the wheel wells 24 will be formed by surrounding and conforming to their shape during the blow molding process. Axle cavity mold blocks 45 are located largely in the upper and lower corners of the mold half 40 as depicted. The axle cavity mold blocks 45 are preferably sized so that when the mold halves 38, 40 are placed into a closed molding position, the mold blocks 45 will extend partially within the mold half 38 proximate one of the wheel well mold blocks 43. The axle cavity mold blocks 45 each present a generally cylindrical axle forming projection 47 which extends from the mold block so as to contact the nearby wheel well mold block 43 when the mold halves 38, 40 are placed into a closed molding position.

The method of the present invention contemplates the simultaneous molding in the blow molding apparatus 36 of the two container modules 12 in tandem coaxial mirror-image relation with their respective rims 18 in juxtaposed facing relation. For this purpose, the mold halves 38, 40 are, therefore, profiled respectively in conformity to the desired configuration of two container modules 12 if so oriented in end-to-end alignment, as will be seen in FIG. 5. In operation, the mold halves 38, 40 are initially separated laterally from one another by appropriate actuating means (not shown) and a compounding plastic extruder (not shown) extrudes a molten hollow plastic tube 46, commonly referred to as a parison, from a location adjacent and centrally with respect to the facing mold halves 38, 40 axially into the area between the mold halves. The mold halves 38, 40 are then brought together into surface abutment to capture the molten plastic parison 46 within the mold cavity 44 cooperatively defined between the abutting mold halves 38, 40. Simultaneously, pressurized air is directed through a discharge tube 48 into the hollow center of the molten plastic parison 46 through an air channel 50 defined between the abutting ends of the mold halves 38, 40 to cause the parison 46 to expand uniformly into conformity with the configuration of the mold cavity 44, as depicted in process in FIG. 5.

Figure 6:
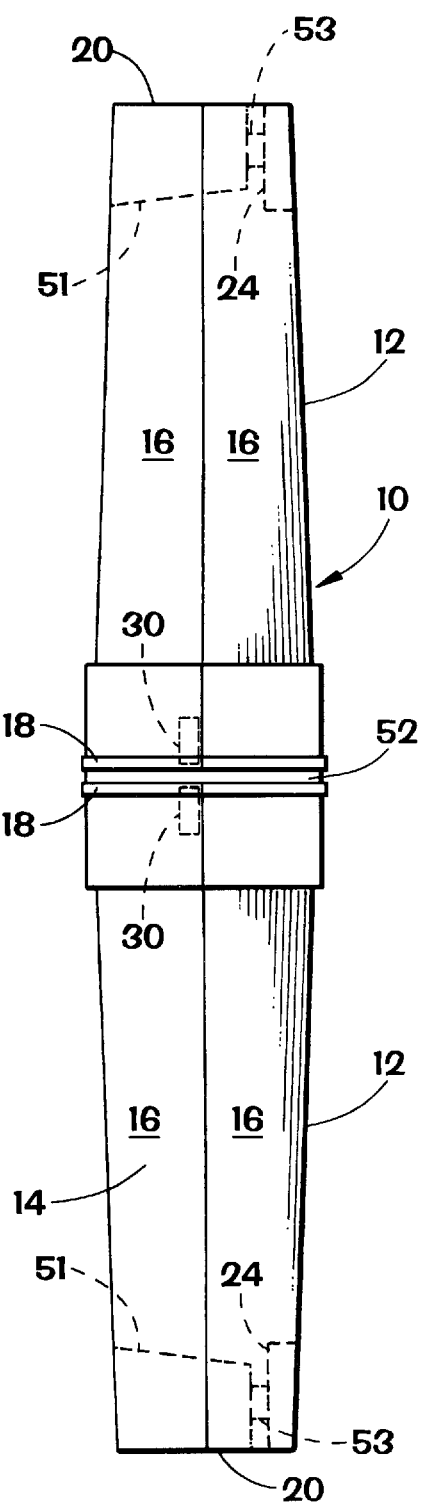
FIG. 6 is a side view of a molded plastic parison, in accordance with the present invention.

After sufficient time to permit the plastic material to cure in the molded configuration conforming to the interior configuration of the mold cavity 44, the mold halves 38, 40 are separated from one another by the aforementioned actuating means to release the molded article, which is illustrated in FIG. 6. As will be recognized, the molded article consists of two of the container modules 12 axially aligned in mirror-image relation with their respective rim portions 18 adjacent one another and their respective bottom wall portions 20 spaced away from one another. The adjacent rims 18 of the two modules 12 are connected by an intervening annular connecting portion 52 molded in conformity to the central annular region of the mold halves 38, 40.

During the blow molding process, the wheel wells 24 are formed as are a pair of axle cavities 51 and axle bearing channels 53 which extend between the axle cavity 51 and wheel well 24 of each container body 12. These cavities and channels are formed as molded portions which facilitate in the affixation of a wheel structure to the completed container 10.

Figure 8:
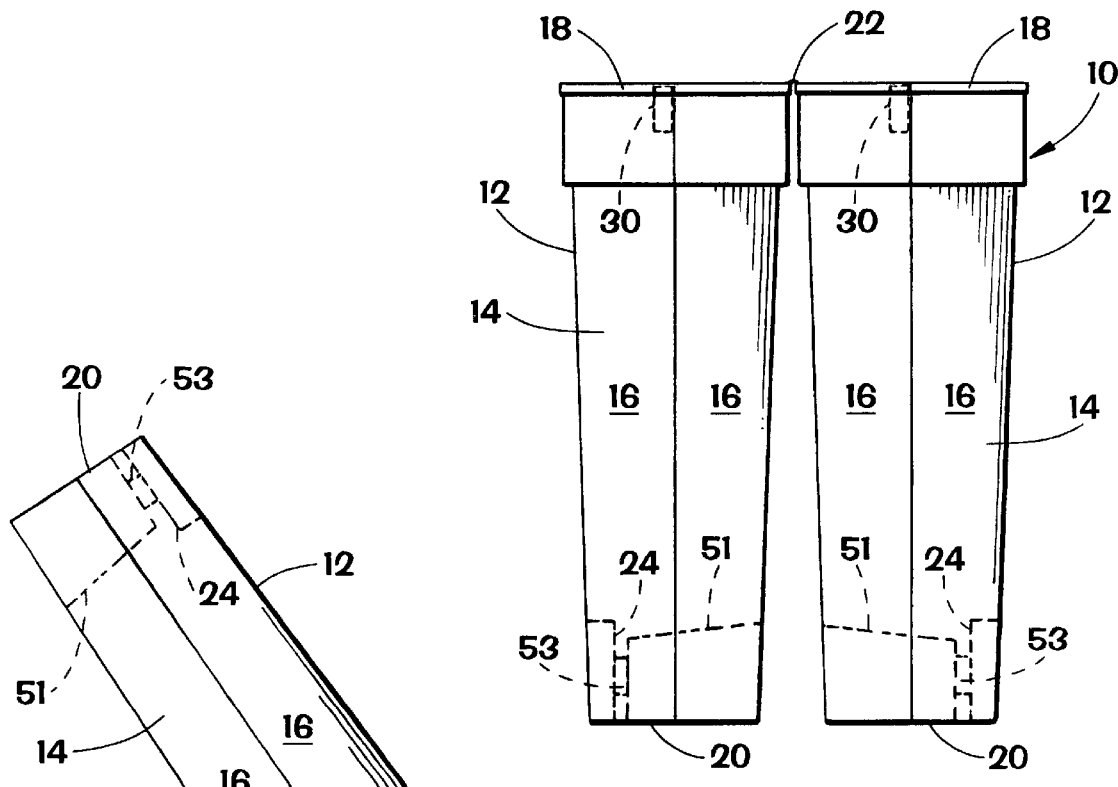
FIG. 8 is a depiction of the apparatus of FIG. 7 after two container modules have been pivoted relative to one another and disposed in adjacent side-by-side facing mirror-image relation.
Figure 7:
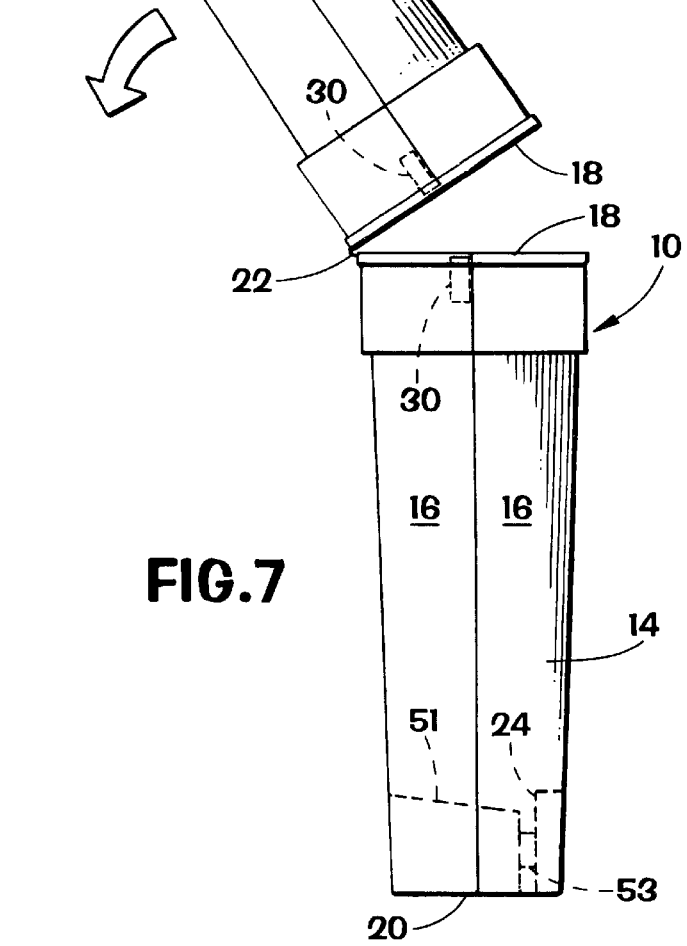
FIG. 7 depicts the molded parison of FIG. 6 after partial removal of the connection portion.

Following removal of the tandem container module article from the molding apparatus 36, the connecting portion 52 is cut closely adjacent each rim 18 and removed along the entirety thereof except along one side of the respective hexagonal rims 18. In this manner, the two container modules 12 remain integrally connected to one another by the remainder of the connecting portion 52 which thereby forms the connecting web 22. Specifically, as depicted in FIGS. 7 and 8, after partial removal of the connection portion 52, the two container modules 12 may be pivoted relative to one another about the remaining web 22 of the connecting portion 52 until the container modules 12 are disposed in adjacent side-by-side facing mirror-image relation (FIG. 8). As seen in FIGS. 5–8, the molding apparatus 36 is profiled to form each container module 12 with a respective wheel well 24 which are oriented by such pivoting step to be disposed at opposite outward sides of the respective container modules 12.

Figure 9:
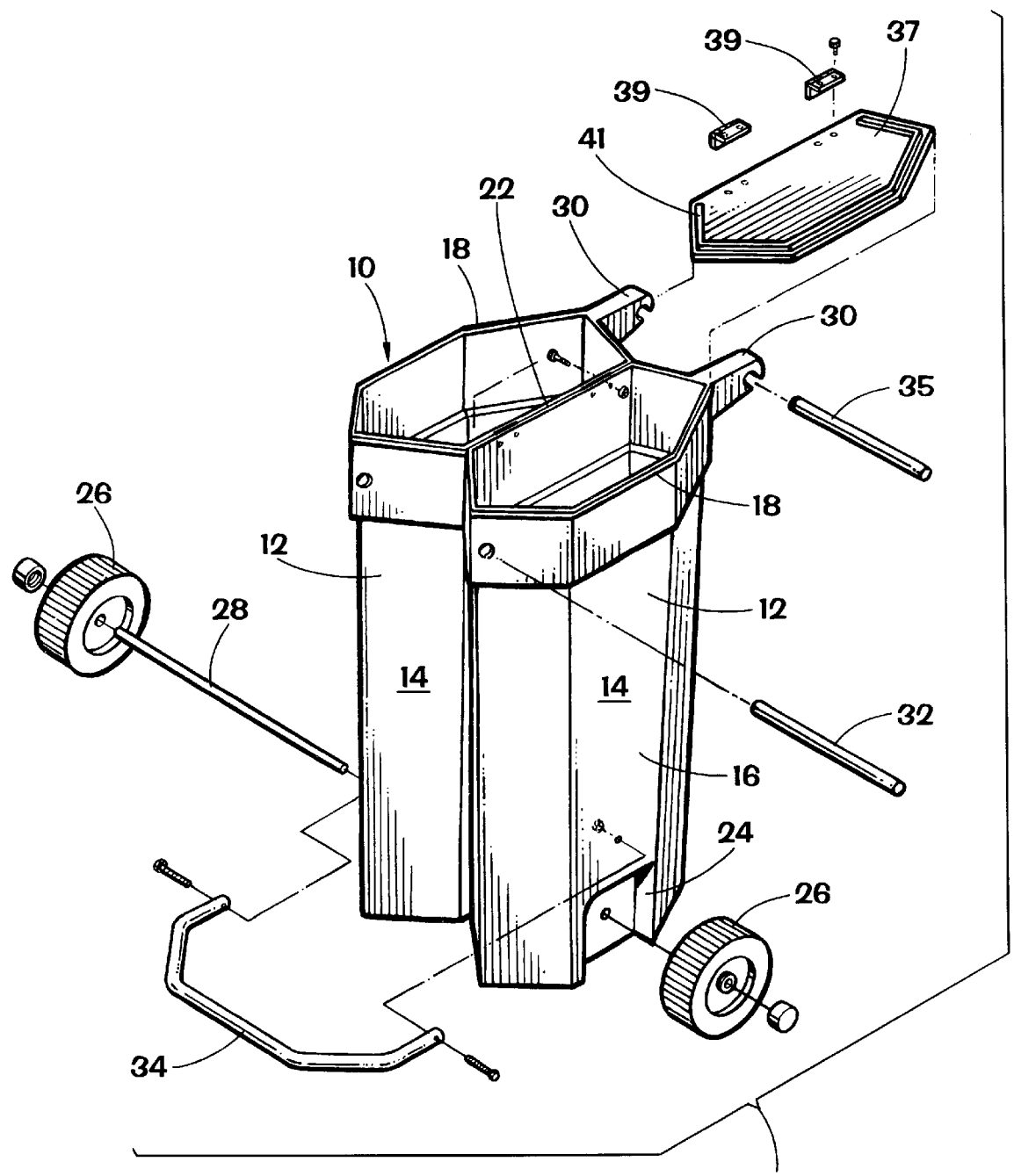
FIG. 9 is a perspective, partially exploded view of a refuse container constructed in accordance with the present invention.

With the modules 12 thusly arranged side-by-side, the wheels 26 may be installed, as shown in FIG. 9, onto an axle 25 inserted through the respective wheel wells 24, axle bearing channels 53 and axle cavities 51 of the container bodies 12. Similarly, the connecting bars 32, 34 and the handle 35 are affixed to the module bodies 14 of the container modules 12 in the above-described locations. As will be understood, the connecting bars 32, 34 together with the axle and wheel assembly 25, 26 serve to rigidly secure and maintain the container modules 12 in the described side-by-side disposition, the connecting web 22 remaining to further integrate the container modules 12 together.

Those persons skilled in the art will readily recognize that the container 10 and the method by which it is fabricated in accordance with the present invention provide significant advantages over known compartmented containers within the state of the art. Since the two container modules 12 are separate units, they are not required to share a dividing wall, which eliminates the need for installation and sealing of a dividing wall as with conventional compartmented containers, simplifies fabrication, and completely eliminates any risk of leakage of the contents of one container module 12 into the other. The simplified manner of fabrication of the container 10 accomplished by the method of the present invention reduces the labor required for fabrication, in contrast to compartmented containers wherein a dividing wall must be installed and sealed and, in turn, enables greater productivity and greater cost savings to be achieved in the manufacturing process. By means of the upper and lower connecting bars 32, 34, together with the provision of the wheels 26, the container 10 of the present invention is well adapted for use in municipal refuse collection systems, particularly those utilizing an automated means of container inversion and dumping.

It will, therefore, be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such embodiments, adaptations, variations, modifications and equivalent arrangements, the present invention being limited only by the claims appended hereto and the equivalents thereof.

I claim:

1. A method of fabricating a refuse container having dual side-by-side container bodies, comprising the steps of forming a unitary hollow container structure having a pair of container bodies each having an open end and a closed end and arranged in general alignment with one another with the respective open ends facing one another and the respective closed ends disposed away from the other container body with a connecting web joining at least a portion of the respective open ends, moving the container bodies relative to one another while bending the connecting web therebetween to orient the container bodies in side-by-side relation with the respective open ends adjacent one another, and transversely affixing the container bodies together in the side-by-side relation.

2. A method of fabricating a refuse container according to claim 1 wherein the step of forming the container structure comprises molding the container structure of a thermoplastic material.

3. A method of fabricating a refuse container according to claim 1 wherein the step of affixing the container bodies together comprises affixing at least one connecting bar to each container body to extend transversely therebetween.

4. A method of fabricating a refuse container according to claim 2 wherein the step of molding comprises blow molding the container structure.

5. A method of fabricating a refuse container according to claim 2 wherein the step of molding comprises molding the container structure with the open ends of both container bodies integrally joined by the connecting web about substantially the entirety of the respective open ends.

6. A method of fabricating a refuse container according to claim 5 wherein the step of molding further comprises forming shaped portions upon the container structure to facilitate affixation of wheel means to the container structure.

7. A method of fabricating a refuse container according to claim 5 and further comprising the step of, after the molding step and before the step of moving the container bodies relative to one another, cutting a portion of the connecting web.

8. A method of fabricating a refuse container, the method comprising the steps of:

a) molding an article having two container bodies axially aligned in mirror-image relation and connected by an intervening annular connecting portion;

b) cutting a portion of the annular connecting portion so that a connecting web remains; and c) orienting the container bodies in a side-by-side relation to form a refuse container.

9. The method of claim 8 wherein the container bodies are oriented in a side-by-side relation by moving the container bodies relative to one another while bending the connecting web therebetween.

10. The method of claim 8 further comprising the step of transversely affixing the container bodies together in a side-by-side relation.

11. The method of claim 10 wherein the container bodies are affixed together in a side-by-side relation by affixing a connecting bar to each container body to extend transversely therebetween.

12. The method of claim 8 further comprising the step of affixing a wheel to the refuse container.

13. The method of claim 8 further comprising the step of affixing a hinged lid to the refuse container.

14. A method of fabricating a refuse container, the method comprising the steps of:

a) molding an article having two container bodies axially aligned in mirror-image relation and connected by an intervening annular connecting portion;

b) cutting a portion of the annular connecting portion so that a connecting web remains; and c) orienting the container bodies in a side-by-side relation to form a refuse container by moving the container bodies relative to one another while bending the connecting web therebetween;

d) affixing the container bodies in a side-by-side relation by affixing a connecting bar to each container body to extend transversely therebetween;

e) affixing a wheel assembly to the refuse container, the wheel assembly having two wheels rotatably mounted on an axle; and f) affixing a hinged cover to the refuse container.

\* \* \* \* \*